United States Patent
Imai et al.

(10) Patent No.: US 9,386,070 B2
(45) Date of Patent: Jul. 5, 2016

(54) DELAY SYSTEM, DELAY DEVICE AND COMMUNICATION DEVICE CONSTITUTING DELAY SYSTEM

(71) Applicant: DENSO CORPORATION, Kariya, Aichi-pref. (JP)

(72) Inventors: Yasumasa Imai, Toyota (JP); Tomohisa Kishigami, Obu (JP); Yoshinori Takai, Obu (JP); Kouji Fujiki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 320 days.

(21) Appl. No.: 13/706,753

(22) Filed: Dec. 6, 2012

(65) Prior Publication Data

US 2013/0151660 A1 Jun. 13, 2013

(30) Foreign Application Priority Data

Dec. 7, 2011 (JP) .................................. 2011-268133

(51) Int. Cl.
*G06F 15/16* (2006.01)
*H04L 29/08* (2006.01)

(52) U.S. Cl.
CPC ................ *H04L 67/02* (2013.01); *H04L 67/12* (2013.01)

(58) Field of Classification Search
CPC ................................ H04L 67/12; H04L 29/08
USPC .......................................................... 709/217
See application file for complete search history.

(56) References Cited

U.S. PATENT DOCUMENTS

| 5,670,933 | A | 9/1997 | Hayashi |
| 5,757,922 | A | 5/1998 | Shiroshita |
| 2002/0159481 | A1 | 10/2002 | Takatori et al. |
| 2005/0203673 | A1* | 9/2005 | El-Hajj et al. .................... 701/1 |
| 2010/0146034 | A1* | 6/2010 | Tanaka ........................... 709/201 |
| 2010/0183000 | A1* | 7/2010 | Nakayama et al. ........... 370/352 |
| 2013/0311774 | A1* | 11/2013 | Larson et al. ................. 713/162 |

FOREIGN PATENT DOCUMENTS

| JP | 08-030873 | 2/1996 |
| JP | 09-321750 | 12/1997 |
| JP | 2002-040939 | 2/2002 |
| JP | 2004-343626 | 12/2004 |

OTHER PUBLICATIONS

Office action dated Dec. 17, 2013 in corresponding Japanese Application No. 2011-268133.

* cited by examiner

*Primary Examiner* — Yves Dalencourt
(74) *Attorney, Agent, or Firm* — Harness, Dickey & Pierce, P.L.C.

(57) ABSTRACT

A delay system which has a communications device connected to a communications network and a relay device which is connected between the communications network ad an external device. The relay device is configured to divide data received from the external device into a plurality of data fragments each containing divided data, and send a sequence of messages, the messages corresponding to the respective divided data and dummy messages being included in the sequence of messages according to a communications rule. The communications device is configured to reconstitute the data from the external device on the basis of the message group from the relay device according to the communications rule.

7 Claims, 6 Drawing Sheets

DELAY SYSTEM, DELAY DEVICE AND COMMUNICATION DEVICE CONSTITUTING DELAY SYSTEM

CROSS-REFERENCE TO RELATED APPLICATION

This application is based on and claims the benefit of priority from earlier Japanese Patent Application No. 2011-268133 filed Dec. 7, 2011, the description of which is incorporated herein by reference.

BACKGROUND

1. Technical Field

The present invention relates to the relay system having the relay device for connecting an external device to the communication device through the delay device.

2. Related Art

Conventionally, as an in-vehicle communications system, a communications system using a bus communications channel such as CAN (Controller Area Network) and LIN (Local Interconnect Network) is known. In such a communications system, ECUs (Electronic Control Units) function as nodes, and a communications network with a plurality of ECUs is formed, as shown in a patent reference 1 (Japanese Unexamined Application Publication No. H08-30873).

By the way, an external device is sometimes connected to the above-described communications network on purpose to add new functions. For example, connecting the external device to the communications network and sending rewriting data (reprogramming data) from the external device to the communication network can rewrite programs stored in an ECU (reprogram).

The method, however, might be used for the wrong purpose, e.g. data stored in the in-vehicle ECUs might be altered by an illegitimate external device connected to the communications network.

Therefore, in a case where an external is connected to the communications network, a relay device is provided between the communications network and the external device for determining whether the external device has legitimacy and preventing illegitimate rewrites. The relay device determines whether frames sent from the external device are legitimate, and sends the determined frames to the communications network of the communications system.

If the data on the communications network is obtained and analyzed, the above-described effect of preventing illegalities by the relay device decreases by half.

SUMMARY

The present disclosure provides a delay system which can make an analysis of data on the communications network to which an external device is connected through the delay device more difficult.

An exemplary embodiment provides a delay system which has a communications device connected to a communications network and a relay device which is connected between the communications network and an external device. The relay device is configured to divide data received from the external device into a plurality of data fragments each containing divided data, and send a sequence of messages, the messages corresponding to the respective divided data and dummy messages being included in the sequence of messages according to a communications rule. The communications device is configured to reconstitute the data from the external device on the basis of the message group from the relay device according to the communications rule.

DETAILED DESCRIPTION OF THE PREFERRED EMBODIMENTS

Figure 1:
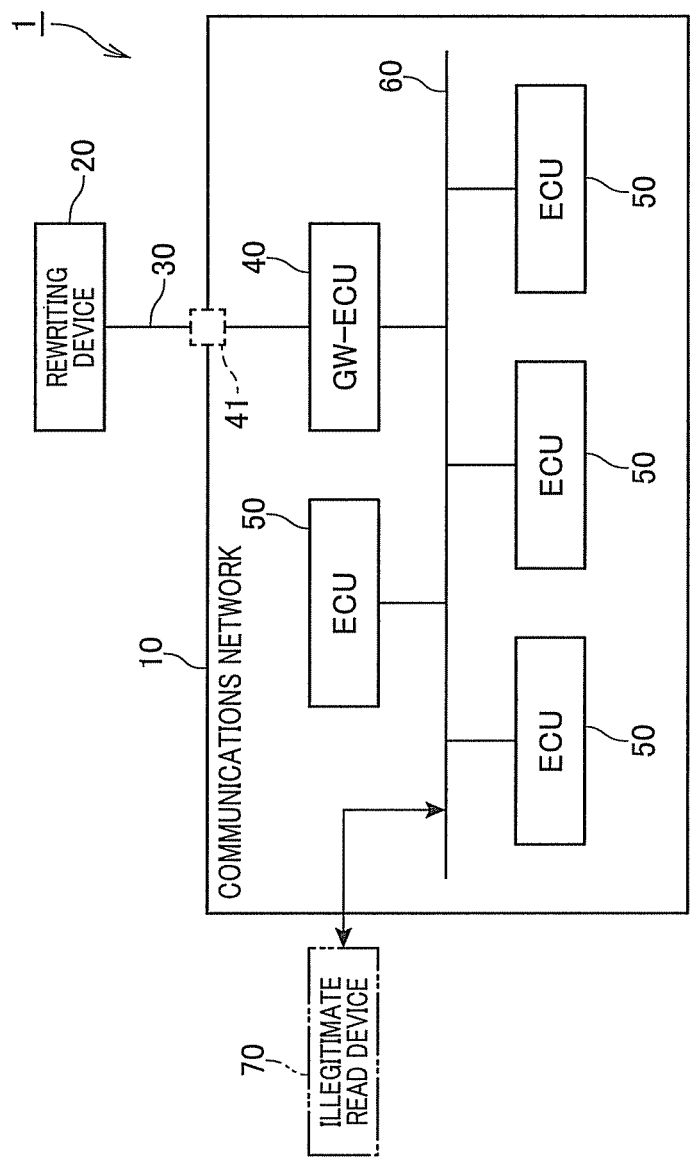
FIG. 1 is a schematic block diagram of a relay system.

Embodiments according to the present invention are described, referring to drawings. FIG. 1 is a schematic block diagram of a relay system 1. In the relay system 1, a rewriting device 20 and a communications network 10 formed in a vehicle are provided. In the communications network 10, serial communication according to the so-called CAN protocol is performed.

The rewriting device 20 is connected to the communications network 10 through a data link connector 41 and a communications channel 30. In the communications network 10, a plurality of ECUs 50 and a gateway ECU (GW-ECU) 40 connected to the rewriting device 20 are provided. The ECUs 50 can become rewriting targets whose programs are rewritten. The serial communication according to the CAN protocol is performed between the rewriting device 20 and the GW-ECU 40. The ECUs 50 function as nodes, and are connected to each other and the GW-ECU 40 via an identical communications channel, a bus communications channel 60. Various ECUs on board (such as an engine ECU for controlling engines, a transmission ECU for controlling transmission units, an air-conditioning ECU for controlling air-conditioning units, and, a navigation ECU for controlling navigation system) can be the ECUs 50.

The bus communications channel 60 is configured such that the level of the signal in the bus communications channel 60 becomes low level when a high-level signal and a low level signal are output from different nodes (the GW-ECU 40, the ECUs 50) into the bus communications channel 60 at the same time. Arbitrations of the messages output from the nodes are performed by using the function of the bus communications channel 60.

In the communication between the GW-ECU 40 and the ECUs 50, a message format in the CAN communication is used. In this embodiment, the messages for sending rewriting data from the rewriting device 20 to the ECU 50 include data messages ("normal message" and "dummy message", as described below) and control messages (for example, response messages, messages for sending a communications rule, as described below). In this embodiment, a common frame format is used for the data messages, wherein the data message has a header field and a data field. Identification data (ID) of the message is provided in the header field. In this embodiment, the arbitration is performed on the basis of the ID. On the other hand, the data field has a data portion in which variable-length data is provided, a size portion in which the size information of the variable-length data or the frame is provided, and, a CRC (cyclic redundancy code) portion in which a CRC for error check is provided. As a control message, for example, a frame format having no data field but having a header field can be used.

Figure 2A:
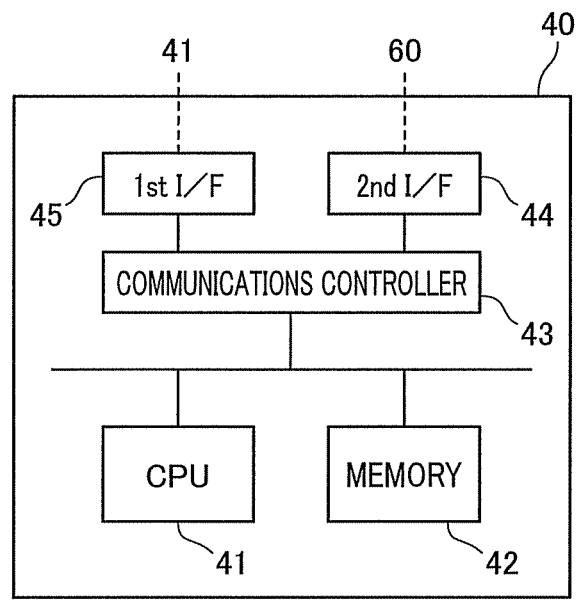
FIG. 2A is a block diagram showing an example of a GW-ECU.
Figure 2B:
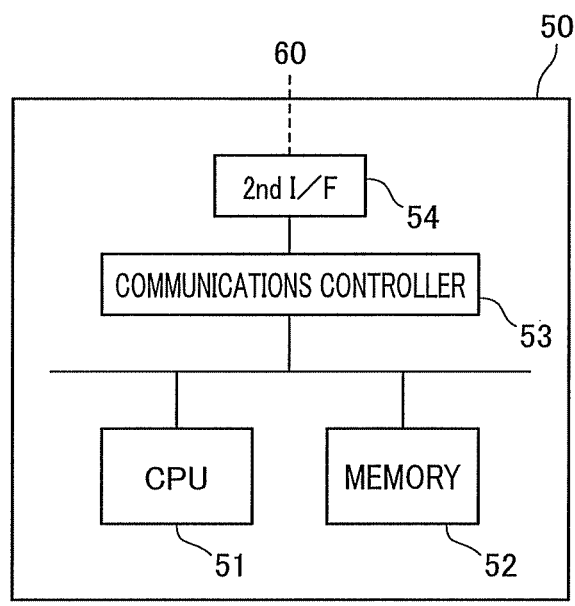
FIG. 2B is a block diagram showing an example of an ECU.

In this embodiment, sending the rewriting data from the rewriting device 20 can reprogram the ECU 50 of the rewriting target through the GW-ECU 40. In the process, the GW-ECU 40 divides the rewriting data sent from the rewriting device 20 into a plurality of data fragments, generates a plurality of normal messages each of which includes the respective divided data, and, sends a sequence of messages including the dummy messages according to a communications rule. On the other hand, the ECU 50 of the rewriting target abandons the dummy messages included in the received data message group on the basis of the communications rule, obtains the normal message, and, reconstitutes the rewriting data. Here, examples of configurations of the GW-ECU 40 and the ECU 50 are described, referring to FIGS. 2A and 2B.

The GW-ECU 40 has a first and second interface 44, 45, a communications controller 43, a CPU 41, and, memories 42. The first interface 44 is connected to the data link connector 41, generates a voltage in the communications channel 30 on the basis of the input from the communications controller 43, and generates a voltage in the GW-ECU 40 on the basis of the input from the communications channel 30. Similarly, the second interface 44 is connected to the bus communications channel 60, generates a voltage in the bus communications channel 60 on the basis of the input from the communications controller 43, and generates a voltage in the communications controller 43 on the basis of the input from the bus communications channel 60. These interface 45, 44 are publicly known. The communications controller 43 controls communications according to CAN protocol to perform CRC checking and so on, a known CAN controller can be used as a communications controller 43. Additional processes according to the present invention can be realized, for example, by performing programs with the CPU 41. Similar to the GW-ECU 40, the ECU 50 has a second interface 54, a communications controller 53, a CPU 51, and, memories 52.

Figure 3:
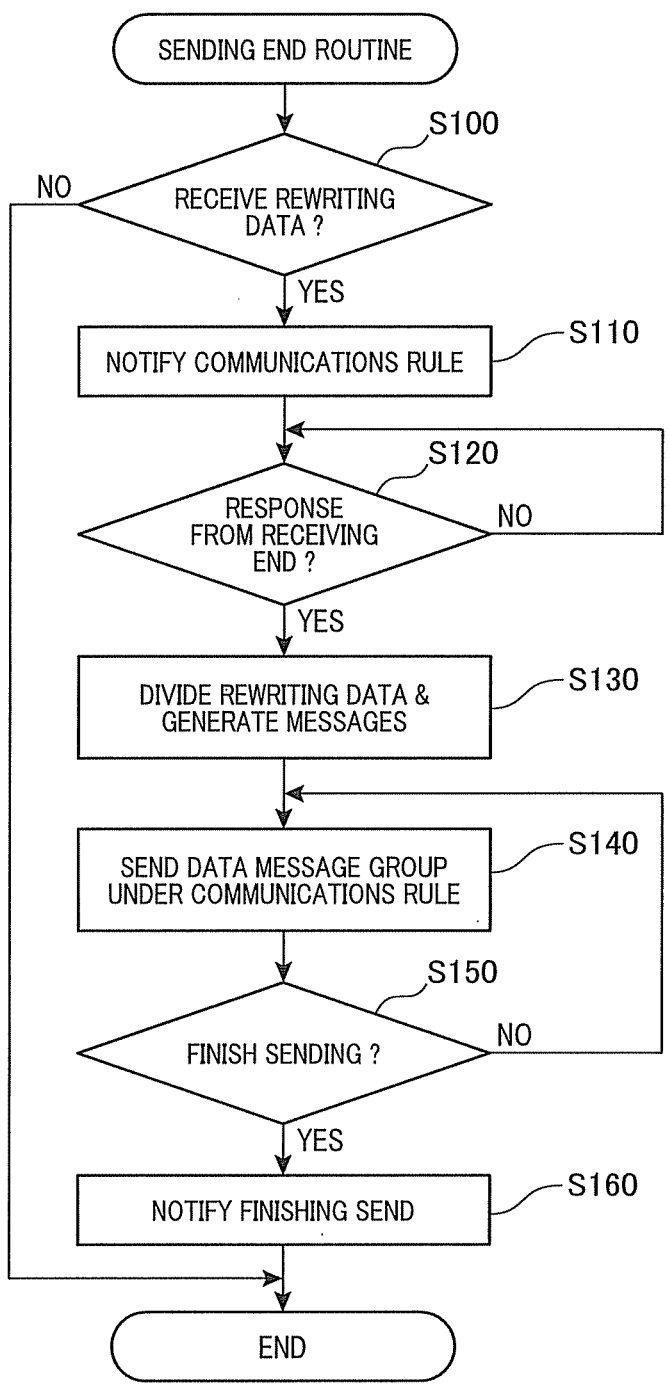
FIG. 3 is a flowchart showing a sending end routine executed with a GW-ECU.

Here, a sending end routine executed with the GW-ECU 40 is described. FIG. 3 is a flowchart showing the sending end routine. The sending end routine is repeatedly executed at predetermined intervals.

In a first step S100, the GW-ECU 40 determines whether it has received the rewriting data. The step is a process where the GW-ECU 40 determines whether it has received the rewriting data from the rewriting device 20. If it is determined that the rewriting data has been received in the step (S100: YES), the flow proceeds to step S110. On the other hand, if it is determined that the rewriting data has been not received (S100: NO), the flow is terminated without executing other processes.

In step S110, the GW-ECU 40 notifies about the communications rule. The GW-ECU 40 may notify of the communications rule itself, alternatively, may notify of information which selects one from some kinds of predetermined communications rules. In this embodiment, the communications rule to be notified is that odd-numbered messages among the messages to be sent are "dummy messages", and the even-numbered messages are "normal messages (the messages correspond to the divided data)". Here, even-number messages have order numbers in the transmission sequence exactly divisible by two, and odd-numbered messages have odd order numbers in the transmission sequence of messages. It is not necessary for the order number to be actually contained within any message.

The ECU 50 of the receiving end sends a response message in response to the notification of the communications rule. Then, in step S120, the GW-ECU 40 determines whether there is the response from the receiving end. If it is determined there is a response from the receiving end (S120: YES), the flow proceeds to the step S130. On the other hand, step S120 is repeatedly executed, while no response is sent by the receiving end (S120: NO).

In step S130 to which the flow proceeds when there is the response of the receiving end, the GW-ECU 40 divides the rewriting data received in step S100 into the divided data, a plurality of data fragments. Then, in step S130, the GW-ECU 40 generates a plurality of messages corresponding to the respective divided data.

In following step S140, the GW-ECU 40 adds in the dummy messages according to the communications rule, and sends a sequence of messages (the data message group) including the normal and dummy messages. In this embodiment, odd-numbered messages are "dummy messages", and even-numbered messages are "normal messages.

In following step S150, the GW-ECU 40 determines whether sending messages have been finished. The step is a step where it is determined whether sending all messages of the data message group has been finished. If sending has been finished (S150: YES), the GW-ECU 40 notifies the finishing of sending in step S160, for example, by sending a control message. Then, the sending end routine is terminated. On the other hand, if sending has not been finished yet (S150: NO), the flow from step S140 is repeated.

Next, a receiving end routine in the ECU 50, a rewriting target, is described. The receiving end routine is repeatedly executed in the ECU 50.

In first step S200, the ECU 50 determines whether the communications rule has been received. This step corresponds to step S110 in FIG. 3. When the communications rule is received from the GW-ECU 40, the ECU 50 makes a decision YES. If the communications rule is received (S200: YES), the flow proceeds to step S210. On the other hand, if the communications rule is not received (S200: NO), the receiving end routine is terminated without executing other processes in the flow.

In step S210, the ECU 50 sends the response message. In response to the response message, the GW-ECU 40 makes a yes in step S120 in FIG. 3.

In following step S220, the ECU 50 determines whether it has received the messages. The step is a step where the ECU 50 determines whether it has received the messages sent from the GW-ECU 40. If it receives the messages (S220: YES), the flow proceeds to step S230. On the other hand, the determination process of step S220 is repeatedly executed, while the messages are not received (S220: NO).

In step S230, the ECU 50 determines whether the received message is a dummy message, on the basis of the communications rule. In this embodiment, the ECU 50 determines the odd-received messages whose order numbers in the received sequence of data message group are odd numbers are dummy messages. If it is determined the received message is the dummy message (S230: YES), the ECU 50 abandons the dummy message in step S240, then the flow proceeds to step S270.

On the other hand, if it is determined the received message is not the dummy message (S230: NO), that is, if the received message is the normal message, the ECU 50 acquires the message in step S250, then takes the divided data from the message in step S260. Then, the flow proceeds to step S270.

In step S270, the ECU 50 determines whether sending the messages have been finished. This step corresponds to step S160 in FIG. 3. If the notification of finishing send is received from the GW-ECU 40, the ECU 50 makes a yes. If it is determined that sending has been finished (S270: YES), the flow proceeds to step S280. On the other hand, if it is determined that sending has not been finished yet (S270: NO), the flow from step S220 is repeatedly executed.

In step S280, the ECU 50 reconstitutes the rewriting data from the divided data taken in step S260. In following step 290, the ECU 50 rewrites its programs with the rewriting data. Then, the receiving end routine is terminated.

Figure 5:
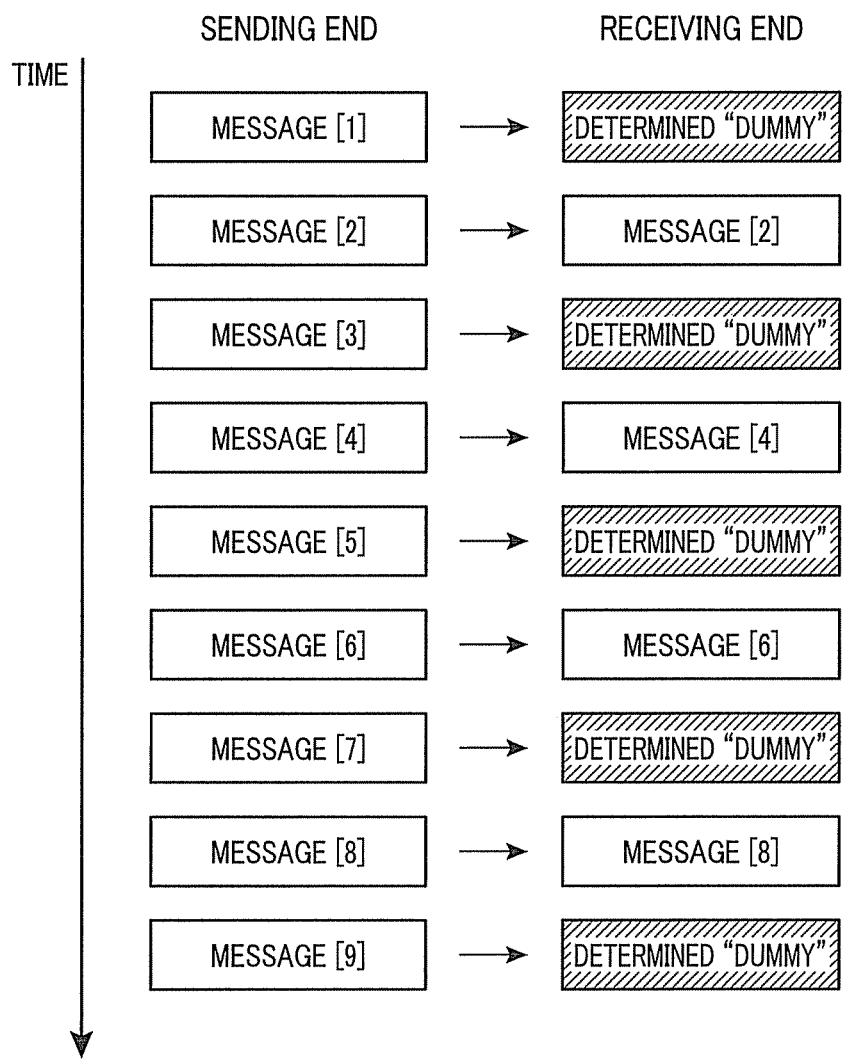
FIG. 5 is an explanatory diagram showing an example of a communications rule.

The message flow in the above-described sending end and receiving end routine is more specifically described, referring FIG. 5.

The sending end, the GW-ECU 40 divides the rewriting data from the rewriting device 20 into a plurality of data fragments, and generates the messages including the respective data fragments as even-numbered messages such as the message [2], the message [4], the message [6] etc. (S130 in FIG. 3). Here, the index numbers in brackets refer to the order numbers in the sequence of data messages. At this time, the GW-ECU 40 makes the dummy messages including dummy data in place of the divided data as odd-numbered messages such as the message [1], the message [3], the message [5] etc. In this embodiment, the divided data and the dummy data are provided in the data portion of the data field, it is not necessary for the dummy messages to contain the divided data, and random data (data which does not be used) can be provided within the data portion of the dummy messages. Then, the GW-ECU 40 sends a sequence of messages including the normal and dummy messages (S140).

Figure 4:
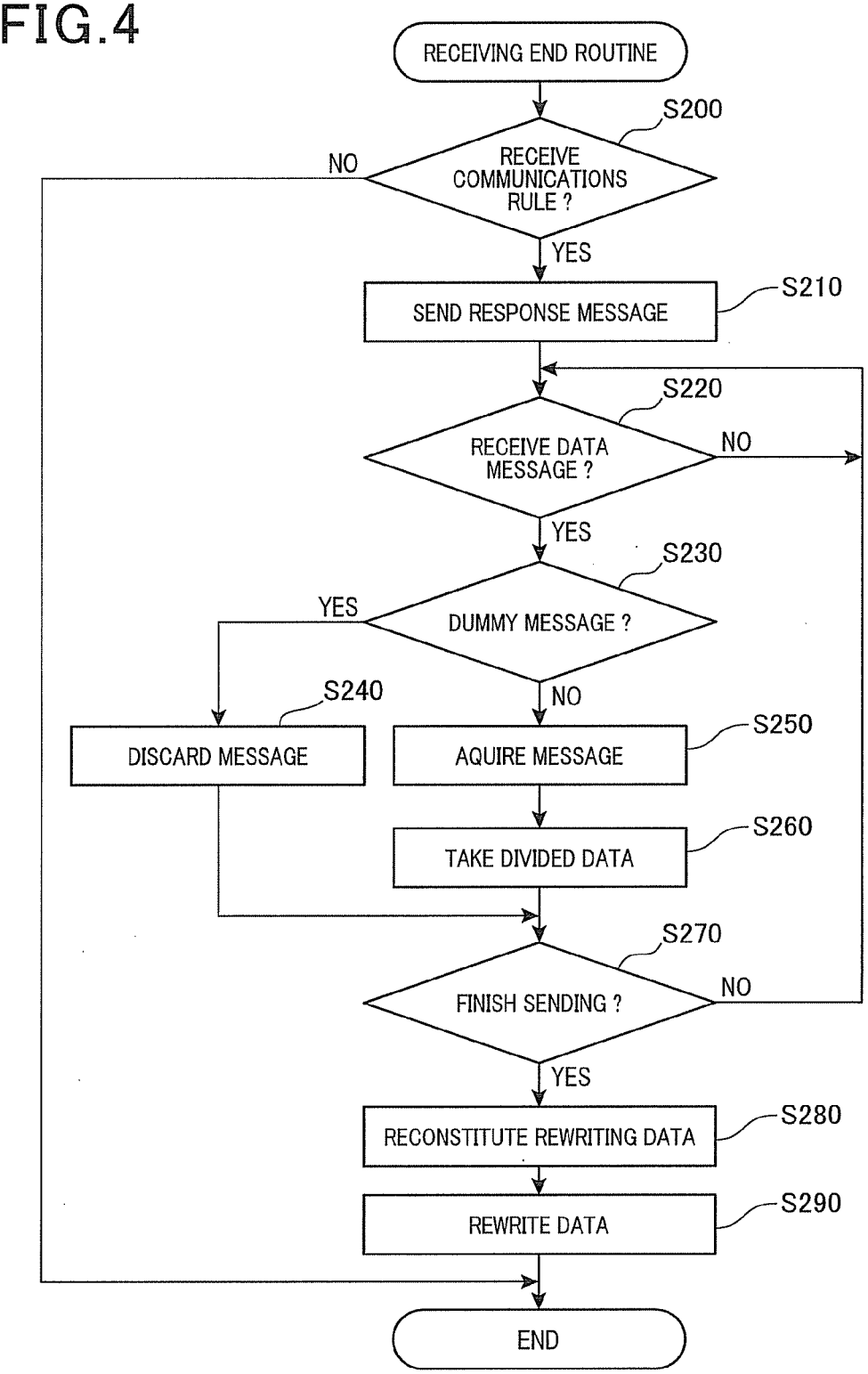
FIG. 4 is a flowchart showing a receiving end routine executed with an ECU of a rewriting target.

The receiving end, the ECU 50 of the rewriting target determines the odd-numbered messages among the received messages are dummy messages (FIG. 4: S230, YES), and discards the dummy messages (S240). The ECU 50 determines the even-numbered messages are the normal messages (S230: NO), and reconstitutes the rewriting data from divided data included in the normal messages (S260, S280).

As described above, in this embodiment, if the GW-ECU 40 receives the rewriting data from the rewriting device 20 (S100 in FIG. 3: YES), the GW-ECU 40 notifies the ECU 50 about the communications rule (S110). Then, if there is a response from the ECU 50 of the receiving end (S120: YES), the GW-ECU 40 divides the rewriting data (S130), and sends a sequence of messages including the normal and dummy messages according to the determined communications rule (S140). On the other hand, if the ECU 50 receives the messages (S220 in FIG. 4: YES), the ECU 50 determines whether or not the received message is a dummy message (S230), on the basis of the communications rule. On the basis of the determination results, the ECU 50 abandons the dummy message (S240), and acquires the normal message (S250). Then, the ECU 50 reconstitutes the rewriting data (S260, S280).

In other words, the GW-ECU 40 and the ECU 50 negotiate the communications rule with each other, and the dummy messages are included in the data message group sent from the GW-ECU 40 to the ECU 50 according to the negotiated communications rule. Even if an illegitimate read device 70 connected to the communications network 10 acquires data on the communications network, the present invention makes it difficult to analyze of data on the communications network 10. Furthermore, this prevents the data stored in the ECUs 40, 50 from being altered.

In this embodiment, the GW-ECU 40 notifies the ECU 50 about the communications rule (S110 in FIG. 3), before it sends the data messages. When the ECU 50 receives the communications rule (FIG. 4: S200, YES), the ECU 50 sends the response message (S210). Thus, the communications rule is negotiated. By applying this method, each communications rule can be negotiated in each case, which can make the analysis of the data on the communications network 10 more difficult.

Furthermore, in this embodiment, as shown in FIG. 5, the communications rule as an example is that the odd-numbered messages are dummy messages, and, the even-numbered are normal messages. Like this, the communications rule defining transmission order of the dummy messages (or/and the normal messages) by using the ordering of order numbers, such as defining what order number in the received sequence the normal and dummy messages have can be used. Though such a communications rule is relatively easy, using it can make the analysis of the data on the communications network 10 difficult.

The relay system 1 in this embodiment corresponds to the "relay system" in the claims, the GW-ECU 40 corresponds to the "relay device", the ECU 50 corresponds to the "communications device", and, the rewriting device 20 corresponds to the "external device", and, the communications network 10 corresponds to the "communications network". The sending end routine shown in FIG. 3 corresponds to the routines as the functions of the "relay device", and, the receiving end routine shown in FIG. 4 corresponds to the routines as the functions of the "communications device".

Other embodiments and configurations are also within the scope of the present invention.

(a) For example, in the above-described embodiment, the odd-numbered messages are dummy messages, and the even-numbered messages are the normal messages. That is to say, the normal messages are discriminated from the dummy messages on the basis of the order number in a sequence of the data messages sent and received repeatedly.

In a similar way, for example, the odd-numbered messages may be the normal messages, and the even-numbered messages may be the dummy messages. Alternatively, the order numbers of the normal messages (or the dummy messages) in a sequence of the data message group, for example, 1, 2, 4, 7, 10, 13, . . . , may be predetermined. Alternatively, the order numbers may be determined at random in each case.

Figure 6:
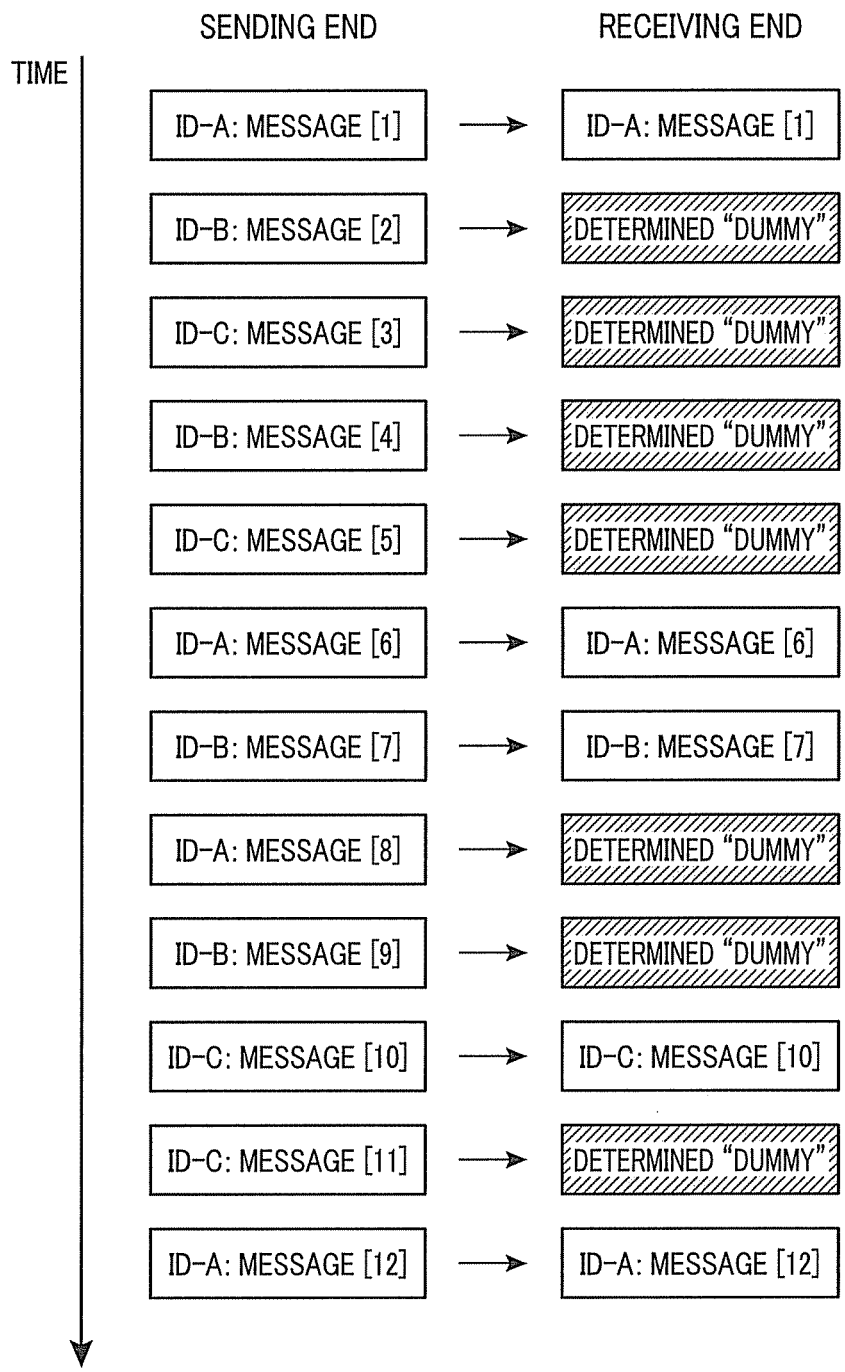
FIG. 6 is an explanatory diagram showing another example of a communications rule.

(b) In a different method from the above-described method (a), as shown in FIG. 6, the communications rule may be related to information included in the messages, such as ID in the headers of the messages. For example, a plurality of different IDs are provided for the messages to be received by the ECU 50 of the rewriting target. In the example shown in FIG. 6, three IDs, ID-A, ID-B and ID-C are provided. The order of the normal messages is defined by the order of the IDs. In the example of FIG. 6, the order of the normal messages is defined such as ID-A->ID-A->ID-B->ID-C->ID-A-> . . . Like this, not only the ordering of the order numbers but also information of the messages may be used for defining the order of the dummy messages (the normal messages). Using a plurality of IDs makes identification of the normal messages difficult and also makes it difficult to determine the ECU 50 which is the rewriting target, which can make the analysis of data on the communications network 10 more difficult. Furthermore, using information included in the header of the message for generating the data message group or identifying the dummy or normal message allows the normal messages to be selected from the data message group quickly and easily. That is to say, the determination of the dummy message in step S230 can be performed by not searching the longer and variable-length data field but using the fixed-length header.

(c) In this embodiment, the GW-ECU 40 notifies the ECU 50 of the rewriting target about the communications rule (S110 in FIG. 3), alternatively, the GW-ECU 40 and the ECU 50 may fix the communications rule in advance. In this case, while the communications rule is fixed, there is an advantage that the sending end and receiving end routines are easy.

(d) The above-described embodiments don't refer to the sending order of the normal messages corresponding to the divided data. On this point, the delay device may change the order of the divided data, and send the data message group including the normal messages corresponding to the divided data whose order is changed. In other words, the delay device may rearrange the normal messages such that the order of the normal messages, i.e. in the sequence where the dummy messages are removed from the data message group, is different from the constitution order of the corresponding divided data in the rewriting data. This can make the analysis of data on the communications network 10 more difficult.

(e) Though the reprogramming with the rewriting device 20 is described as an example in the embodiments, the above-described algorithm can be applied to general data communications in the bus communications channel 60. Furthermore, using the algorithm allows the delay system to determine whether the rewriting device 20 has legitimacy. That is to say, the rewriting device 20 and the GW-ECU 40 negotiate the communications rule. Then, if the rewriting device 20 sends messages according to the negotiated communications rule, the GW-ECU 40 determines the rewriting device 20 has legitimacy. Then, data communication after legitimacy of the rewriting device 20 being determined becomes valid. In this case, the analysis of the data on the communications network 10 is made difficult.

(f) Though the rewriting device 20 has a wired connection with the data link connector 41 in the embodiments, the present invention may also be applied to a remote reprogramming via wireless.

Though the invention has been described with respect to the specific preferred embodiments, many variations and modifications will become apparent to those skilled in the art upon reading the present application. It is therefore the intention that the claims be interpreted as broadly as possible in view of the prior art to include all such variations and modifications.

What is claimed is:

1. A relay system comprising:
    a relay device connected between a communications network and an external device, the relay device being configured to divide data received from the external device into a plurality of data fragments each containing divided data, set identification data into messages according to a communications rule, and send a sequence of the messages, the sequence of the messages including normal messages and dummy messages, the normal messages containing the respective divided data, the communications rule defining identification data to determine the normal messages in the sequence of messages, the relay device being configured to set a plurality of different identification data to the respective messages in the sequence, the identification data in the messages being used for arbitration of messages in the communications network;
    a communications device connected to the communications network, the communications device being configured to receive the sequence of messages, determine whether or not each of the received messages is one of the dummy messages on the basis of the identification data of the received message in the sequence, abandon the determined dummy messages and acquire the normal messages, thereby reconstituting the data from the external device; and wherein the relay device is configured to send the communications rule to determine the normal messages in the sequence of messages before the relay device sending the sequence of messages.

2. The relay system according to claim 1, wherein
    the relay device is configured to change the order of the divided data, and send the sequence of the messages including the messages corresponding to the divided data whose order is changed.

3. The relay system according to claim 1, wherein the communications network is built in vehicles.

4. A relay device constituting the relay system according to claim 1.

5. A communication device constituting the relay system according to claim 1.

6. The relay system according to claim 1, wherein
    the relay device is configured to send the order of the identification data as the communications rule to determine the normal messages in the sequence of messages.

7. The relay system according to claim 1, wherein the relay device being configured to set the plurality of different identification data to the respective messages in the sequence of messages for the same communications device.

\* \* \* \* \*